9890X
A. Parson.
Thrashing Mach.
Patented Jul. 2, 1836.
Fig: 1. Left side view
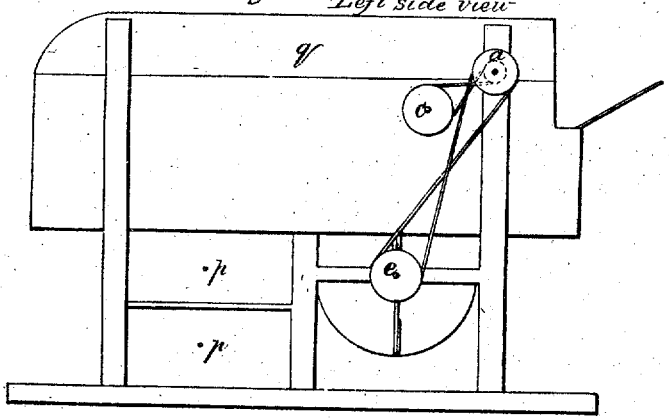
Fig: 2. Section
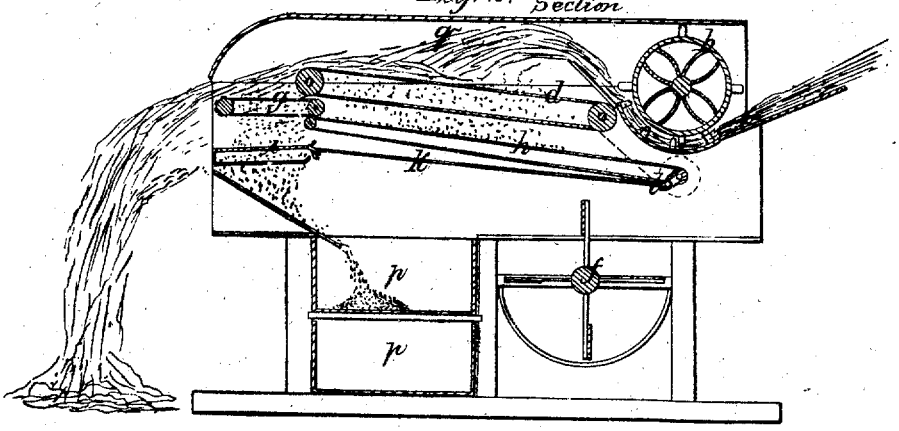
Fig: 3. Right side view
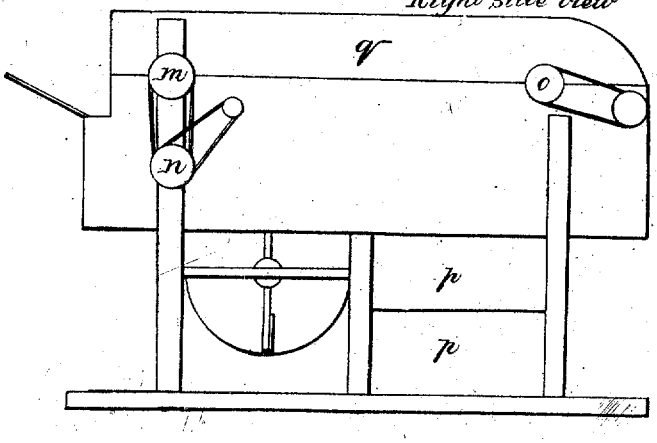

9890X

July 2, 1836

Aaron Parsons, of Buckfield State of Maine

Letters Patent

The schedule referred to in these Letters Patent and making part of the same
containing a description in the words of the said Aaron Parsons, himself of his
"Improvement in the Machine for Thrashing and cleaning grain –

To all to whom these presents shall come.

Be it known that I Aaron Parsons of Buckfield in the county of Oxford and State
of Maine, have invented a new and useful improvement in a Machine for Thrash
ing and cleaning grain, and that the following is a full and exact description thereof.

1st. I construct a frame, about 6½ feet long, two feet wide, and three feet high 2d. near one end of said frame a concave about one fourth of a circle, extending
across the frame confined to the same by iron bolts. in said concave I place four rows
of teeth about one inch apart in the row.

3d. Above said concave I place a cylinder with four rows of teeth (more or less)
so that when the cylinder revolves the teeth, in the cylinder, shall pass between the
teeth in the concave.

4. on the right hand end of the shafts of the above named cylinder, I place
a pulley, about six inches in diameter (more or less according to the speed of the
power applied) on the left hand I place a pulley 6 inches in diameter, between
this, and the frame I place a pulley about 8 inches diameter.

5. Just forward of the cylinder, I place an iron shaft sufficiently long to re-
ceive a pulley on each end, outside the frame, on the left hand end, I place a pulley
about eight inches in diameter; on the other end I place a pulley. about four inches in
diameter. On this shaft within the frame I place three other pulleys, four inches in
diameter, one in the middle and the others just within the frame.

6. Across the frame, about two feet and six inches from this shaft, I place a
similar shaft with three pulleys on the inside of the frame, and one on the right hand
end outside the frame.

7. Around these shafts and pulleys I pass an endless screen, formed of wires, placed
one half inch apart extending across the inside of the frame, connected at each 9890X July 2, 1836 end and supported in the middle by leather belts, the use of this seive is to separate the straw from the grain, and is denominated the straw seive, and is put in motion by a belt, passing round the pulley on the left hand end of the shaft, (named in the fifth specification ) and the small pulley on the left hand end of the main cylinder shaft, (named in the fourth specification ) said belt must be crossed.

8. Immediately forward of the concave across the frame I place an iron shaft, on the right hand end, of which I place a pulley about eight inches in diameter, on the other end, I make a crank, on said shaft within the frame I place a roller or cylinder three inches in diameter. Across the frame, about three feet from said cylinder I place a roller one inch in diameter.

9. Around these rollers I pass a belt or apron the whole width of the inside of the frame. The use of this belt or apron is to receive the grain as it passes through the straw seive and convey it to the seives hereafter named. This belt or apron is moved by a belt passing round the pulley named in the eighth specification, and the second pulley named in the fifth specification.

10. Under the last named roller, I place a frame with grooves to contain two seives which are put in motion by a sweep passing from said frame to the crank, named in eight specification.

11. About the seives last named, I place an endless seive similar to that named in the seventh specification. This last seive is moved by a belt passing from a pulley on the right hand end of one of the [illegible] shafts, to the pulley named in the sixth specification on the outside of the frame.

12, under the apron above named, I place a rotary fan moved by a belt passing from a pulley on the left hand end of the shaft, of said fan, to the large pulley, on the left hand end of the main cylinder shaft, named in the fourth specification the wind of said fan passes through the seives above named, 13. Under the seives I place a slide or fine seive to convey the grain into drawers placed just forward of the fan.

14. Immediately forward of the main cylinder I place a slide or elevator placed at an elevation of 45. degrees.

15 Over the whole frame I place a roof or bonnet. The machine is put in motion by horse or water power with a belt passing round the pulley on the right hand end of the main cylinder. All the above proportions of length -

9890X July 2, 1836 breadth, height &c. may be varied to be any relative proportion necessary and convenient. Several parts of the above machine as above specified are necessarily included in the above specification, which I do not claim as my own invention All that I claim as my own invention are the straw sieves for separating the straw from the grain, and the peculiar manner of applying the other parts of the machine, to the uses above named, the other parts included in my machine for the useful operation thereof, are described in the above specification, for a proper and full explanation thereof In testimony that the above is a true specification of my improvement; as above described, I have hereunto set my hand this twenty second day of June in the year of our Lord one thousand eight hundred & thirty six Witness Benj. Spalding
Samuel F. Brown Aaron Parsons

E.
M.H.

1164 [illegible]

(Patented 2nd July 1836)

Drawing